United States Patent
Greil et al.

(10) Patent No.: US 6,709,999 B2
(45) Date of Patent: Mar. 23, 2004

(54) MOLDED PART OF CERAMIC MATERIAL DERIVED FROM POLYMERS, PROCESS FOR PRODUCING CERAMIC MOLDED PARTS AND SLIDING ELEMENT HAVING A MOLDED PART

(75) Inventors: Peter Greil, Weisendorf (DE); Oliver Dernovsek, München (DE); Hans-Michael Güther, Königstein (DE); Ulrich Wislsperger, Bonn (DE)

(73) Assignee: SGL Carbon AG, Meitingen (DE)

(*) Notice: Subject to any disclaimer, the term of this patent is extended or adjusted under 35 U.S.C. 154(b) by 138 days.

(21) Appl. No.: 09/883,476

(22) Filed: Jun. 18, 2001

(65) Prior Publication Data

US 2002/0035026 A1 Mar. 21, 2002

(30) Foreign Application Priority Data

Jun. 17, 2000 (DE) .......................... 100 30 011

(51) Int. Cl.$^7$ .................. C04B 35/52; C04B 35/565; C04B 35/584
(52) U.S. Cl. .................. 501/88; 501/96.1; 501/96.5; 501/97.1; 501/99; 501/133
(58) Field of Search .................. 501/88, 96.1, 96.5, 501/97.1, 99, 133

(56) References Cited

U.S. PATENT DOCUMENTS

| | | | | |
|---|---|---|---|---|
| 4,108,929 A | * | 8/1978 | Prochazka et al. | 264/332 |
| 4,455,385 A | * | 6/1984 | Prochazka et al. | 501/88 |
| 4,690,909 A | | 9/1987 | Okuno et al. | 423/345 |
| 4,942,145 A | | 7/1990 | Moehle et al. | |
| 4,962,069 A | * | 10/1990 | Burns et al. | 501/90 |
| 5,708,114 A | * | 1/1998 | Barnard et al. | 528/15 |
| 5,762,895 A | | 6/1998 | Schwetz et al. | 423/345 |

FOREIGN PATENT DOCUMENTS

| | | | |
|---|---|---|---|
| DE | 264 4503 | * | 4/1977 |
| DE | 3344050 C2 | | 11/1988 |
| DE | 198 06 044 A1 | | 8/1999 |
| DE | 19846967 | * | 4/2000 |
| EP | 0 400 862 A1 | | 12/1990 |
| EP | 0412428 A1 | | 2/1991 |
| EP | 0412428 B1 | | 11/1994 |
| EP | 0709352 A1 | | 5/1996 |
| EP | 0685437 B1 | | 11/1996 |
| WO | WO93/24423 | | 12/1993 |
| WO | WO99/41211 | | 8/1999 |

OTHER PUBLICATIONS

"High–Yield Synthesis of $Si_3N_4$/SiC Ceramic Materials by Pyrolysis of a Novel Polyorganosilazane", Seyfert et al., Journal of the American Ceramic Society, vol. 67, 1984, pp. C–132–C133.

"Preparation of Silicon Carbide from Organosilicon Gels: I, Synthesis and Characterization of Precursor Gels" White et al., Advanced Ceramic Materials, vol. 2, No. 1, 1987, pp. 45–52.

* cited by examiner

*Primary Examiner*—Paul Marcantoni
(74) *Attorney, Agent, or Firm*—Laurence A. Greenberg; Werner H. Stemer; Gregory L. Mayback

(57) ABSTRACT

A molded part of a ceramic material derived from polymers includes a composite body of a single-phase or multi-phase, amorphous, partially crystalline or crystalline matrix of silicon carbide (SiC), silicon nitride ($Si_3N_4$), silicon dioxide ($SiO_2$) or mixtures thereof. The matrix contains graphite inclusions and the density of the ceramic material is at least 85% of the theoretical value. The molded part is produced by subjecting a mixture formed of a polymer component in an amount of 30 to 80 wt. % referred to the total weight of the mixture, fillers in an amount of 0 to 30 wt. % and graphite in an amount of 10 to 70 wt. %, to a forming process with heating to effect crosslinking of the polymer components, followed by a pyrolysis process. In particular, the molded parts are produced from polymers of the group including polysilanes, polysiloxanes, polysilazanes or polycarbosilanes. A process for producing ceramic molded parts and a sliding element having a molded part are also provided.

47 Claims, No Drawings

MOLDED PART OF CERAMIC MATERIAL DERIVED FROM POLYMERS, PROCESS FOR PRODUCING CERAMIC MOLDED PARTS AND SLIDING ELEMENT HAVING A MOLDED PART

BACKGROUND OF THE INVENTION

Field of the Invention

The present invention relates to a molded part of ceramic material derived from polymers, a process for its production by pyrolysis, and a sliding element having the molded part.

The production of ceramic materials by pyrolysis of suitable polymeric organic precursors is known from numerous publications. Polysilanes, polycarbosilanes, polysilazanes, polysiloxanes or similar compounds are normally preferred as polymeric organic precursors. Examples of many such compounds may be found in a publication entitled "High Yield Synthesis Of $Si_3N_4$/SiC Ceramic Materials by Pyrolysis of a Novel Polyorganosilazane", by Seyfert et al. in J. Am. Ceram. Soc. (1984) C-132. In that publication it is disclosed that alkylchlorosilanes can be reacted with ammonia in the presence of a strong Lewis base and used as precursors for the production of silicon nitride ceramic materials.

The pyrolysis of siloxanes is described in a publication entitled "Adv. Ceramic Materials" by D. White, 2 [1] (1987) p. 45 ff., and leads in an inert gas atmosphere or in a reducing atmosphere to products containing silicon carbide (SiC).

However, a problem encountered in the production of solid molded parts of such materials was that volatile decomposition products were always released during the pyrolysis. That resulted in high porosities and a drastic shrinkage of the material accompanied by a significant increase in density.

According to the teaching of European Patent Application 0 412 428 A1, molded parts having a high density are produced by pyrolyzing a mixture of organosilicon polymer plus metallic filler. With that method a ceramic transformation accompanied by an increase in density can be achieved, leading to a reduction in the interfering porosity and a reduction in shrinkage, which is likewise unacceptably high in practice. It is possible to produce molded parts in that way by using known molding techniques for plastics materials. However, those molded parts do not have satisfactory dry-running properties enabling them to be used as sliding elements in mixed friction or dry-running applications.

Sliding elements with the best heretofore achieved dry-running properties preferably are formed of carbon graphite, for example EK 2230 grade from SGL CARBON GmbH, Meitingen, Germany, which have an SiC element as a counter-running partner. Those sliding elements can be produced as individual moldings in which running surfaces are also subjected to a final mechanical treatment. The associated production costs are substantially higher than in the case where sliding elements are produced by conventional plastics forming processes. Coal graphite materials are produced by mixing and compressing solid carbon-containing fillers that are at least partially of a graphitic nature (e.g. natural graphite, electrographite) with carbonizable binders such as pitches and resins, and then carbonizing the compressed mixtures at temperatures between 750° C. and 1300° C. under the exclusion of air.

Sliding rings of ceramic materials, such as for example sintered silicon carbide, are also known. However, those materials according to European Patent EP 0 685 437 B1, corresponding to U.S. Pat. No. 5,762,895, may only be used for mixed friction applications, and are based on the fact that the material has a high porosity so that the lubricating film that is normally present between the friction partners is deposited in the pores of the sliding rings and after a brief dry running the lubricating film remaining in the pores is released in order to prevent a permanent damaging dry running. Adding solid lubricants such as preferably graphite according to European Patent Application EP 0 709 352 A1, permits the coefficients of friction of the sliding rings to be improved further, though the use of sliding rings remains limited to the case of mixed friction. The problem of dry friction cannot be solved with such a material, since only the at least partial presence of a lubricating film will permit the good sliding behavior of the material. That behavior is also illustrated further by the results of a reference measurement with SiC given in Table 2.

International Publication No. WO 99/41211 describes a process for the production, from polysilazanes, of crack-free, high density ceramic molded parts based on Si/B/C/N that can be used for tribological purposes. Depending on the composition, the material of the molded parts contains incorporated deposits of various lubricating substances such as for example graphite, boron nitride, titanium oxides and titanium carbide nitride. In that connection, a crosslinked polysilazane powder is first of all compressed hot in a depression at a defined temperature that is higher than the temperature maximum in the TMA diagram of the optimally crosslinked polymer, and is then pyrolyzed. The inexpensive production processes used in plastics technology for shaping, such as for example injection molding and extrusion, cannot be used for the production of the molded parts. The polysilazanes used for the production are furthermore significantly more expensive than other polymeric organic precursors, such as in particular polysiloxanes, which thus additionally increases the production costs of the molded parts. The molded parts produced according to International Publication No. WO 99/41211 have coefficients of friction down to less than 0.1 under dry-running conditions.

SUMMARY OF THE INVENTION

It is accordingly an object of the invention to provide a molded part of ceramic material derived from polymers, a process for producing ceramic molded parts and a sliding element having a molded part, which overcome the hereinafore-mentioned disadvantages of the heretofore-known products and processes of this general type and in which the molded parts can be produced by using production methods known in plastics technology, exhibit a low shrinkage of at most 10% during production in addition to a high density of at least 85% of a theoretical value and have satisfactory dry-running properties.

A further object of the invention was to provide molded parts of a ceramic material that can be used as bearings and sliding ring seals for dry-running applications and that can be produced from inexpensive polymeric organic precursors as raw material, in particular from polysiloxanes.

Another object of the present invention is to provide a material for molded parts that is more suitable than known materials as a material for bearings and sliding ring seals in dry-running applications.

With the foregoing and other objects in view there is provided, in accordance with the invention, a molded part of a ceramic material produced by pyrolysis of polymers, comprising a composite body of a single-phase or multi-phase, amorphous, partially crystalline or crystalline matrix selected from the group consisting of silicon carbide (SiC), silicon nitride ($Si_3N_4$), silicon dioxide ($SiO_2$) and mixtures thereof, such as for example oxycarbides, oxynitrides, carbonitrides or oxycarbonitrides. The matrix contains graphite inclusions and the ceramic material has a density of at least 85% of a theoretical value.

With the objects of the invention in view, there is also provided a process for the production of ceramic molded parts, which comprises preparing a mixture containing polymer components in an amount of 30 to 80 wt. % referred to a total weight of the mixture, fillers in an amount of 0 to 30 wt. %, and graphite in an amount of 10 to 70 wt. %. The mixture is subjected to a forming process with heating of the mixture to crosslink the polymer components and then to a pyrolysis process for producing the ceramic molded parts.

The polymer components which are used according to the invention are, in particular, polysilanes, polysiloxanes, polysilazanes or polycarbosilanes or similar compounds and mixtures thereof known in the prior art. The inexpensive polysiloxanes which are preferably used in this connection lead to oxidic phases in the matrix of the ceramic composite materials. Methylhydroxylpolysesquisiloxane with an empirical formula of $(CH_3)SiO_{1.5}$ and a mean molecular weight in the region of 20,000 g/mole is particularly preferably used as a polymer component according to the invention. The proportion of the polymer component in the mixture from which the ceramic molded parts according to the invention are produced is preferably 40 wt. % to 70 wt. % and particularly preferably 50 wt. % to 60 wt. %.

The fillers which are preferably used according to the invention are high density fillers such as metallic silicon, aluminum, zirconium, hafnium, vanadium, niobium, tantalum, chromium, molybdenum, tungsten, titanium or elementary boron or alloys of molybdenum and silicon or of chromium and silicon. Lanthanides and/or intermetallic compounds of subgroups IV to VI of the Periodic System with boron, silicon and/or aluminum, as well as mixtures of the described fillers, may also be used. It may also be convenient to use organometallic compounds and/or precursors, such as for example alkyls, cycloalkyls, aryls, alkoxides and/or salt-like compounds, such as for example hydrides or oxides of the metals and/or intermetallic compounds, instead of the filler components. Particularly preferred fillers are boron and silicon. The fillers are preferably added to the pyrolysis mixture in finely divided form, preferably as dry powders with a mean particle size, specified as a $D_{50}$ value, in a range of from 1 to 5 μm, measured with a laser granulometer (type Cilas 715). Preferred amounts of the fillers have been found in practice to be in particular 5 wt. % to 25 wt. % of the mixture, in particular 10 wt. % to 20 wt. %.

The graphite that is used is preferably added in an amount of 20 wt. % to 50 wt. % of the initial mixture. The proportion of graphite is particularly preferably 30 wt. % to 40 wt. % of the mixture. The graphite being used preferably has a density in a range of from 2.0 to 2.3 g/cm³, particularly preferably from 2.1 to 2.2 g/cm³, measured with a helium pycnometer. The mean grain size ($D_{50}$) of the graphite that is used is in a range of from 2 μm to 16 μm, preferably 3 to 7 μm, measured with a laser granulometer (type Cilas 715). According to the invention, optimally suitable forms of graphite also have a good crystalline configuration, i.e. an essentially homogeneous alignment of graphite layers. Synthetic graphite, such as for example electrographite, or natural graphite, may be used for this purpose.

It has completely surprisingly been found that in the pyrolysis of the aforedescribed pyrolysis mixture, the total amount of graphite is not consumed in the formation of carbides, but instead the graphite is almost completely retained as an inclusion in the ceramic material derived from polymers. The production of the ceramic material according to the invention is carried out under the following conditions: the polymerization of the initial mixture is carried out at temperatures in a range of from 230° to 300° C., and the pyrolysis of the initial polymers takes place at 900° to 1500° C., preferably at 1000° to 1200° C., under an inert gas atmosphere such as argon or pure nitrogen or under a nitrogen/hydrogen mixture over a period of 30 to 60 hours. The graphite incorporated in the material may act as a highly active lubricant in the case where sliding rings or sealing discs are produced as molded parts according to the invention from ceramic materials derived from polymers and in which the conventional lubrication by externally added lubricants is missing and dry-running ensues. The aforementioned molded parts are mainly employed in the case of mixed friction, though they may also be used for pure dry running. The coefficient of friction f as a measure of the dry-running properties of the molded parts according to the invention has in general, on the basis of DIN 50322, values of less than 0.1, preferably values of less than 0.06 and particularly preferably values of less than 0.045.

With the objects of the invention in view, the ceramic materials which are derived from polymers are particularly suitable for the production of sliding elements having a sealing and/or bearing function in movable parts in pumps, compressors, general machinery and in furnace building, especially for dry-running applications.

A preferred embodiment of the ceramic materials according to the invention involves the addition of a small amount of a catalytic substance to the initial mixture that induces a polycondensation process of the polymers which are employed. A catalyst to be added to the initial mixture may be selected from platinum group metals, iron, cobalt and/or nickel, as well as in the form of organometallic compounds, precursors and salt-like compounds and mixtures thereof. In this connection their proportion in the amount of the initial mixture is less than 10%, preferably between 0.2% and 5%, and particularly preferably between 0.5% and 1%. Particularly preferred catalysts are metal acetyl acetonates such as aluminum acetyl acetonate ($C_{15}H_{21}AlO_6$) and iron acetyl acetonate. The use of the catalysts leads to a lower porosity of the ceramic material according to the invention and to a lower linear shrinkage of the ceramic material during the pyrolysis process.

The ceramic materials according to the invention are characterized by a low open porosity, which is normally less than 12 vol. %, preferably less than 7 vol. % and particularly preferably less than 4 vol. %. The ceramic materials according to the invention are also characterized by a low shrinkage behavior during the pyrolysis process. The linear shrinkage is normally less than 10%, preferably less than 7% and particularly preferably less than 5%.

All processes that have generally proved suitable in ceramic technology or plastics technology may be used to shape the ceramic materials according to the invention which are derived from polymers. These processes include pressureless casting, hot press molding, injection molding, extrusion, as well as a recent innovation, laser-assisted so-called rapid prototyping.

Other features which are considered as characteristic for the invention are set forth in the appended claims.

Although the invention is described herein as embodied in a molded part of ceramic material derived from polymers, a process for producing ceramic molded parts and a sliding element having a molded part, it is nevertheless not intended to be limited to the details given, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying examples.

DESCRIPTION OF THE PREFERRED EMBODIMENTS

EXAMPLE 1

A batch is first of all produced from 50 g of solids of a mass composition of 60 wt. % of methylhydroxylpolysesquisiloxane (MOHPS NH2100), manufactured by Nuenchritz GmbH, Germany, 10 wt. %. of metallic silicone having a density of 2.33 g/cm$^3$ and a mean grain size ($D_{50}$) of 3.1 $\mu$m and 30 wt. % of ground graphite U19F300 from SGL CARBON GmbH having a mean grain size ($D_{50}$) of 3.6 $\mu$m (all percentage figures refer to the total weight of the solids), with 50 g of $Al_2O_3$ spheres and 70 cm$^3$ of isopropanol, which is then homogenized for 24 hours in a rolling mill. The low viscosity mixture is then dried at 40° C. in a vacuum rotary evaporator. Following this the resultant solid residue is ground for 2 minutes in a steel vibratory mill and the powder which is obtained is screened through a 100 $\mu$m sieve. The powder mixture which is thus obtained is compressed dry in a laminate press (manufactured by Bürkle, Freudenstadt, Germany) under a compression force of 10 MPa at a temperature of 230° C. for 45 minutes to form a green body having dimensions of 3 mm×50 mm×50 mm. The green body is then post-crosslinked for 90 minutes under normal pressure at 230° C. Small sample rods having dimensions of 3 mm×4 mm×50 mm are then prepared mechanically from these green bodies for the following investigations.

The test rods were next placed in a sealed furnace that had been flushed twice with nitrogen. The furnace was then heated under normal pressure over a period of 20 hours to a temperature of 1250° C. This temperature was maintained for a period of 10 hours and the furnace was then allowed to cool down over a further 10 hours. The properties of the resultant ceramic material are summarized in Table 1 following the Examples.

EXAMPLE 2

The production of test rods of Example 2 corresponds to that of Example 1, except that 0.5% of iron acetyl acetonate, referred to the total weight of the solids, is now also added to the solids of the batch.

Disc-shaped test bodies having a height of 4 mm and a diameter of 25 mm are also produced from the mixture in a thermopress (manufactured by Jean Wirtz, Düsseldorf, Germany) at the same compression force, for friction experiments. The surface of the test bodies was polished to a quality of 6 $\mu$m after their removal from the furnace.

The properties of the test bodies are also shown in Table 1, and the frictional behavior of the resultant ceramic material is shown in Table 2.

EXAMPLE 3

A mixture of 60 wt. % of MOHPS NH2100 as in Example 1, 10 wt. % of elementary boron having a density of 2.27 g/cm$^3$ and a mean grain size ($D_{50}$) of 1.5 $\mu$m, and 30 wt. % of ground graphite U19F300 from SGL CARBON GmbH, having a mean grain size ($D_{50}$) of 3.6 $\mu$m (all percentage figures referring to the total weight of the mixture), was processed as described in Example 2 into small test rods and disc-shaped test bodies.

The test bodies were then pyrolyzed as in the preceding examples, after which they were polished. The properties are shown in the following Table 1 and the friction properties of the resultant ceramic material of Example 3 are shown in Table 2.

TABLE 1

| Property Reactive Filler | | Example 1 Silicon | Example 2 Silicon | Example 3 Boron |
|---|---|---|---|---|
| Reactive Filler | [wt. %] | 10 | 10 | 10 |
| Graphite | [wt. %] | 30 | 30 | 30 |
| MOHPS | [wt. %] | 60 | 60 | 60 |
| Catalyst Fe Acetyl Acetonate | [Addition wt. %] | 0 | 0.5 | 0 |
| Shrinkage | [%] | 9 | 6 | 10 |
| Open Porosity | [vol. %] | 6 | 3 | 10 |
| Bending Strength | [MPa] | 95 ± 10 | 50 ± 5 | 60 ± 5 |

The values given in Table 1 were determined according to the following measurement methods:

The open porosity was determined according to DIN 66133. The bending strength was determined according to DIN 51902.

The ceramic materials produced according to Examples 1 to 3 are characterized by the values shown in Table 1. The efficiency of the ceramic materials becomes clear, particularly when compared in the friction experiment with SiC, to those test bodies representative of the current prior art. In the dry-running test and at a rotational speed of 1500 min$^{-1}$ carbon/graphite samples (EK 2230 from SGL CARBON GmbH) and silicon carbide samples according to the prior art have significantly higher coefficients of friction f and the test bodies heat up to a significantly greater extent than those of Examples 2 and 3, as is seen in Table 2.

TABLE 2

| Property | Example 2 | Example 3 | EK 2230 | SiC |
|---|---|---|---|---|
| Coefficient of friction f after 20-minute test time | 0.05 | 0.04 | 0.08 | 0.20 |
| Heating up of the Test bodies [° C.] | 40 | 23 | 47 | 137 |

The values given in Table 2 were determined according to the following measurement method:

The coefficient of friction f as a measure of the dry-running properties of the molded parts according to the invention was determined on the basis of DIN 50322 in a tribological configuration including an axial sliding ring seal at a rotational speed of 1500 min$^{-1}$, corresponding to a sliding speed of 1.5 m/sec. and an axial force, corresponding to a normal force $F_n$, of 40 N in counterrunning to SiC.

We claim:

1. A molded part of a ceramic material produced by pyrolysis of polymers, comprising:
    a composite body of a single-phase or multi-phase, amorphous, partially crystalline or crystalline matrix selected from the group consisting of silicon carbide, silicon nitride, silicon dioxide and mixtures thereof;

said matrix containing from 20 wt. % to 50 wt. % graphite inclusions; and said ceramic material having a density of at least 85% of a theoretical value.

2. The molded part of a ceramic material produced by pyrolysis of polymers according to claim 1, wherein said matrix is formed of at least one substance selected from the group consisting of oxycarbides, oxynitrides, carbonitrides and oxycarbonitrides.

3. The molded part of a ceramic material produced by pyrolysis of polymers according to claim 1, wherein said ceramic material is derived from polymers of a group consisting of polysilanes, polysiloxanes, polysilazanes and polycarbosilanes.

4. The molded part of a ceramic material produced by pyrolysis of polymers according to claim 1, wherein said matrix of said ceramic material contains oxidic phases.

5. The molded part of a ceramic material produced by pyrolysis of polymers according to claim 3, wherein said ceramic material is derived from methylhydroxylpolysesquisiloxane as a polymer.

6. The molded part of a ceramic material produced by pyrolysis of polymers according to claim 1, wherein said ceramic material is produced from a mixture containing fillers in an amount of 0 to 30 wt. % as well as graphite in an amount of 10 to 70 wt. %, in addition to a polymer component in an amount of 30 to 80 wt. % referred to a total weight of said mixture.

7. The molded part of a ceramic material produced by pyrolysis of polymers according to claim 6, wherein said mixture contains graphite in an amount of 10 to 70 wt. %.

8. The molded part of a ceramic material produced by pyrolysis of polymers according to claim 7, wherein said mixture has a proportion of said polymer component of from 40 wt. % to 70 wt. %.

9. The molded part of a ceramic material produced by pyrolysis of polymers according to claim 7, wherein said mixture has a proportion of said polymer component of from 50 wt. % to 60 wt. %.

10. The molded part of a ceramic material produced by pyrolysis of polymers according to claim 1, wherein said graphite inclusions have a density in a range of from 2.0 g/cm$^3$ to 2.3 g/cm$^3$.

11. The molded part of a ceramic material produced by pyrolysis of polymers according to claim 1, wherein said graphite inclusions have a density in a range of from 2.1 g/cm$^3$ to 2.2 g/cm$^3$.

12. The molded part of a ceramic material produced by pyrolysis of polymers according to claim 1, wherein said graphite inclusions have a mean size ($D_{50}$) in a range of from 2 µm to 16 µm.

13. The molded part of a ceramic material produced by pyrolysis of polymers according to claim 1, wherein said graphite inclusions have a mean size ($D_{50}$) in a range of from 3 µm to 7 µm.

14. The molded part of a ceramic material produced by pyrolysis of polymers according to claim 1, wherein said graphite inclusions have a substantially homogeneous alignment of graphite layers.

15. The molded part of a ceramic material produced by pyrolysis of polymers according to claim 1, wherein said molded parts have a coefficient of friction (f) in a dry-running test on a basis of DIN 50322, of less than 0.1.

16. The molded part of a ceramic material produced by pyrolysis of polymers according to claim 1, wherein said molded parts have a coefficient of friction (f) in a dry-running test on a basis of DIN 50322, of less than 0.06.

17. The molded part of a ceramic material produced by pyrolysis of polymers according to claim 1, wherein said molded parts have a coefficient of friction (f) in a dry-running test on a basis of DIN 50322, of less than 0.045.

18. The molded part of a ceramic material produced by pyrolysis of polymers according to claim 1, wherein said ceramic material has an open porosity of less than 12 vol. %.

19. The molded part of a ceramic material produced by pyrolysis of polymers according to claim 1, wherein said ceramic material has an open porosity of less than 7 vol. %.

20. The molded part of a ceramic material produced by pyrolysis of polymers according to claim 1, wherein said ceramic material has an open porosity of less than 5 vol. %.

21. A process for producing ceramic molded parts, which comprises:

preparing a mixture containing polymer components in an amount of 30 to 80 wt. % referred to a total weight of the mixture, fillers in an amount of 0 to 30 wt. %, and graphite in an amount of 10 to 70 wt. %;

subjecting the mixture to a forming process with heating of the mixture to crosslink the polymer components; and then subjecting the formed mixture to a pyrolysis process for producing a molded part including:

a composite body of a single-phase or multi-phase, amorphous, partially crystalline or crystalline matrix selected from the group consisting of silicon carbide, silicon nitride, silicon dioxide and mixtures thereof;

said matrix containing from 20 wt. % to 50 wt. % graphite inclusions; and said ceramic material having a density of at least 85% of a theoretical value.

22. The process according to claim 21, which further comprises selecting the fillers in the mixture from at least one of the group consisting of metallic silicon, aluminum, zirconium, hafnium, vanadium, niobium, tantalum, chromium, molybdenum, tungsten, titanium, elementary boron, alloys of molybdenum and silicon, alloys of chromium and silicon, lanthanides, intermetallic compounds of subgroups IV to VI of the Periodic System with at least one of boron, silicon and aluminum, and mixtures thereof.

23. The process according to claim 21, which further comprises adding the fillers to the mixture in finely divided form.

24. The process according to claim 21, which further comprises adding the fillers to the mixture as dry powders having a mean particle size $D_{50}$ in a range of from 1 to 5 µm.

25. The process according to claim 21, which further comprises adding the fillers to the mixture in an amount of 5 wt. % to 25 wt. %, referred to the total weight of the mixture.

26. The process according to claim 21, which further comprises adding the fillers to the mixture in an amount of 10 wt. % to 20 wt. %, referred to the total weight of the mixture.

27. The process according to claim 21, which further comprises adding the graphite to the mixture in an amount of 20 wt. % to 50 wt. %, referred to the total weight of the mixture.

28. The process according to claim 21, which further comprises adding the graphite to the mixture in an amount of 30 wt. % to 40 wt. %, referred to the total weight of the mixture.

29. The process according to claim 21, which further comprises providing a material selected from the group consisting of electrographite and natural graphite as the graphite in the mixture.

30. The process according to claim 21, which further comprises carrying out the step of crosslinking the polymer components at temperatures in a range of from 230° to 300° C.

31. The process according to claim 21, which further comprises carrying out the pyrolysis process for the production of the ceramic molded parts at temperatures in a range of from 900° to 1500° C., under an inert gas.

32. The process according to claim 21, which further comprises carrying out the pyrolysis process for the production of the ceramic molded parts at temperatures in a range of from 1000° to 1200° C., under an inert gas.

33. The process according to claim 21, which further comprises adding to the mixture a minor amount of a catalytically active substance inducing a polycondensation process of the polymers being used.

34. The process according to claim 33, which further comprises selecting the catalytically active substance to be added to the mixture from at least one of the group consisting of catalyst platinum group metals, iron, cobalt, nickel, organometallic compounds, precursors, salt-like compounds and mixtures thereof.

35. The process according to claim 33, which further comprises setting a proportion of the catalyst in the mass of the initial mixture at less than 10 wt. %.

36. The process according to claim 33, which further comprises setting a proportion of the catalyst in the mass of the initial mixture at between 0.2 wt. % and 5 wt. %.

37. The process according to claim 33, which further comprises setting a proportion of the catalyst in the mass of the initial mixture at between 0.5 wt. % and 1 wt. %.

38. The process according to claim 33, which further comprises adding metal acetyl acetonates, as the catalyst.

39. The process according to claim 38, which further comprises selecting the metal acetyl acetonates from the group consisting of aluminum acetyl acetonate ($C_{15}H_{21}AlO_6$) and iron acetyl acetonate.

40. The process according to claim 33, which further comprises carrying out the pyrolysis process with a linear shrinkage of the molded parts of less than 10%.

41. The process according to claim 33, which further comprises carrying out the pyrolysis process with a linear shrinkage of the molded parts of less than 7%.

42. The process according to claim 33, which further comprises carrying out the pyrolysis process with a linear shrinkage of the molded parts of less than 5%.

43. The process according to claim 21, which further comprises selecting the forming process from the group consisting of pressureless casting, hot press molding, injection molding, extrusion and laser-assisted rapid prototyping.

44. A process for producing ceramic molded parts, which comprises:
preparing a mixture containing polymer components in an amount of 30 to 80 wt. % referred to a total weight of the mixture, at least one of organometallic compounds and precursors in an amount of 0 to 30 wt. %, and graphite in an amount of 10 to 70 wt. %;
subjecting the mixture to a forming process with heating of the mixture to crosslink the polymer components; and
then subjecting the formed mixture to a pyrolysis process for producing the molded part according to claim 1.

45. The process according to claim 44, which further comprises selecting the at least one of organometallic compounds and precursors from the group consisting of alkyls, cycloalkyls, aryls, alkoxides, salt-like compounds, hydrides, oxides of the metals and intermetallic compounds thereof.

46. The molded part according to claim 1, configured as a sliding element having at least one of a sealing and bearing function in movable parts in pumps, compressors, general machinery, furnace building and dry-running applications.

47. The molded part according to claim 1, wherein said matrix contains from 30 wt % to 40 wt. % graphite inclusions.

* * * * *